(12) United States Patent
Dubey

(10) Patent No.: US 7,732,032 B2
(45) Date of Patent: Jun. 8, 2010

(54) LIGHTWEIGHT, FIBER-REINFORCED CEMENTITIOUS PANELS

(75) Inventor: Ashish Dubey, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 11/025,850

(22) Filed: Dec. 30, 2004

(65) Prior Publication Data

US 2006/0147681 A1 Jul. 6, 2006

(51) Int. Cl.
*C04B 16/00* (2006.01)
*C04B 20/00* (2006.01)
*C04B 38/00* (2006.01)

(52) U.S. Cl. .......................... 428/57; 106/672; 428/58; 428/60; 428/192

(58) Field of Classification Search .................... 428/57, 428/38, 53, 189, 58, 192, 60; 106/672
See application file for complete search history.

(56) References Cited

U.S. PATENT DOCUMENTS

| | | | |
|---|---|---|---|
| 3,903,879 A | 9/1975 | Riley et al. | |
| 4,076,884 A | 2/1978 | Riley et al. | |
| 4,133,928 A | 1/1979 | Riley et al. | |
| 4,199,366 A | 4/1980 | Schaefer et al. | |
| 4,306,911 A | 12/1981 | Gordon et al. | |
| 4,339,273 A | 7/1982 | Meier et al. | |
| 4,841,702 A * | 6/1989 | Huettemann | 52/309.12 |
| 5,298,071 A | 3/1994 | Vondran | |
| 5,502,090 A | 3/1996 | Matsunase et al. | |
| 6,197,423 B1 | 3/2001 | Rieder et al. | |
| 6,241,815 B1 | 6/2001 | Bonen | |
| 6,265,056 B1 | 7/2001 | Rieder et al. | |
| 6,503,625 B1 | 1/2003 | Rieder et al. | |
| 6,528,151 B1 * | 3/2003 | Shah et al. | 428/221 |
| 6,592,790 B2 | 7/2003 | Rieder et al. | |
| 6,596,210 B2 | 7/2003 | Rieder et al. | |
| 6,620,487 B1 * | 9/2003 | Tonyan et al. | 428/192 |
| 6,723,162 B1 | 4/2004 | Cheyrezy et al. | |

(Continued)

FOREIGN PATENT DOCUMENTS

FR 2698394 5/1994

OTHER PUBLICATIONS

Dr. Surendra P. Shah et al, ICCI Project No. 99-1/2.1B-2, "Extruded Fiber-Reinforced Cement Composites Containing Fly Ash", pp. 1-4, Nov. 1, 1990-Oct. 31, 2000.

(Continued)

*Primary Examiner*—Brent T O'Hern
(74) *Attorney, Agent, or Firm*—Novak, Druce + Quigg LLP

(57) ABSTRACT

Lightweight, fiber reinforced, cementitious panels possessing exceptional toughness for use as building components in applications such as roofing elements, siding elements, framing and sheathing elements, and substrate elements for installation of floor finishes in residential and other building construction types. The panels employ a continuous phase resulting from the curing of an aqueous mixture of inorganic binder, PVA fibers and lightweight filler. The inorganic binder may be, for example, hydraulic cement alone, or a combination of hydraulic cement and pozzolan/s, or a combination of hydraulic cement, alpha hemihydrate, active pozzolan and optionally lime. The PVA fibers reinforce the continuous phase and are randomly distributed throughout the composite. Typical panels of the invention have a density of 60-85 pcf.

33 Claims, 5 Drawing Sheets

U.S. PATENT DOCUMENTS

| | | |
|---|---|---|
| 6,773,646 B2 | 8/2004 | Rieder et al. |
| 6,809,131 B2 | 10/2004 | Li et al. |
| 7,445,738 B2 | 11/2008 | Dubey et al. |
| 2001/0023019 A1 | 9/2001 | Reider et al. |
| 2004/0081816 A1 | 4/2004 | Pyzik et al. |
| 2004/0092625 A1 | 5/2004 | Pollock et al. |
| 2005/0066857 A1* | 3/2005 | Li et al. ............ 106/672 |
| 2005/0066858 A1* | 3/2005 | Li et al. ............ 106/692 |

OTHER PUBLICATIONS

Patricia Kim Nelson et al., Journal of Materials in Civil Engineering, "Fracture Toughness of Microfiber Reinforced cement composites", pp. 384-391, Sep./Oct. 2002.

Qian Xiao-qian et al., Journal of Zhejiang University Science, (ISSN 1009-3095, Monthly), "Enhancement of Durability of Glass Fiber-Reinforced Cement With PVA", vol. 3 No. 2, pp. 181-187, 2002.

* cited by examiner

LIGHTWEIGHT, FIBER-REINFORCED CEMENTITIOUS PANELS

FIELD OF THE INVENTION

This invention relates generally to lightweight panels suitable for applications as roofing elements, framing and sheathing elements, siding elements, and substrate elements for installation of floor finishes in residential and other building construction types having significantly improved flexural toughness due to employing polyvinyl alcohol (PVA) fibers having selected properties as reinforcement. More particularly, the invention relates to panels able to resist impacts loads imposed by hail or other objects.

BACKGROUND OF THE INVENTION

Cementitious panels have been used in the construction industry to form the interior and exterior walls of residential and/or commercial structures. The advantages of such panels include resistance to moisture compared to standard gypsum-based wallboard. However, a drawback of such conventional panels is that they do not have sufficient flexural toughness to the extent that such panels may be comparable to, if not tougher than, wood-based panels such as plywood or oriented strand board (OSB).

Building structures during their lifetimes are subjected to a variety of impact loads (e.g., hail damage, or damage from objects hurled at the buildings due to tornados or hurricanes). Not all building sheathing panels are sufficiently tough to withstand such impact loads. Where it is necessary to demonstrate impact load resistance, the sheathing panels are measured to determine the impact the panel can resist without failure.

Flexural toughness as characterized in this specification is measured as equal to the total area under the flexural load versus deflection curve for a specimen loaded in four-point bending.

Flexural toughness is measured as the total area under the load versus deflection curve for a flexural specimen loaded in four-point bending according to ASTM C947 test method.

Wood-based panels achieving significant flexural toughness usually are plywood or oriented strand board (OSB), which consist of pieces of wood that are glued together. These panels can provide flexural toughness, but each is combustible and neither is durable when exposed to water. A panel made of hydraulic cement will resist water, but is much heavier than the wood panels and has insufficient flexural toughness. It is believed that there is no panel currently available which can provide the flexural toughness of the present invention, while avoiding the deficiencies of plywood or OSB panels.

Furthermore, the need for cementitious panels configured to behave in the construction environment similar to plywood and OSB, means the panels are nailable and can be cut or worked using conventional saws and other conventional carpentry tools. It is also desirable for cementitious structural panels to have low density to facilitate handling.

The panel should be capable of being cut with the circular saws used to cut wood.

The panel should be capable of being fastened to framing with nails or screws.

The panel should be dimensionally stable when exposed to water, i.e., it should expand as little as possible, preferably less than 0.1% as measured by ASTM C 1185.

The panel should not be biodegradable or subject to attack by insects or rot.

The panel should provide a bondable substrate for exterior finish systems.

After curing for 28 days, the flexural strength of a 0.5 inch (12.7 mm) thick panel having a density of 60 lb/ft$^3$ (961 kg/m$^3$) to 75 lb/ft$^3$ (1200 kg/m$^3$) is at least 750 psi (5.2 MPa), and preferably greater than 1000 psi (6.9 MPa) as measured by the ASTM C 947 test.

It should be evident that the currently available cement-based and wood-based products and composites meet some, but not all, of the above performance characteristics. In particular, there is a need for improved cement-based panels that are lightweight having improved flexural toughness and which exceed the capability of the currently-used cement-based and wood-based by providing non-combustibility and water durability.

Although glass fibers have been used to reinforce cement, they are known to lose strength with time since the glass is attacked by the lime present in cured cement. This may be offset, to some extent, by coating the glass fibers or by using a special alkali-resistant glass. Other fibers have been suggested to reinforce cement, such as metal fibers, wood or other cellulose fibers, carbon fibers, or polymer fibers. Col. 10, lines 1-6, says, "Although they do not provide strength equivalent to glass fibers, it is possible to include some polymer fibers in the panels of the invention. Such polymer fibers, for example polypropylene, polyethylene, polyacrylonitrile and polyvinyl alcohol fibers, are less expensive than alkali-resistant glass fibers and are not subject to attack by lime."

U.S. Pat. No. 6,241,815 to Bonen, incorporated herein by reference, discloses a composition for use in construction materials, which may be substituted for high performance concrete, patching materials, joint compounds, and the like, such as backer boards or panels, which includes a settable calcium sulfate, preferably a hemihydrate, Portland cement, a finely divided pozzolanic material, lime, and an aggregate, optionally including other additives. The volume ratio of the aggregate to the combined calcium sulfate, Portland cement, pozzolanic material, and lime (a cementitious binder) is equal to or greater than 2/1. Panels made from this composition are useful, particularly when exposed to water since they have good dimensional stability.

U.S. Pat. No. 4,199,366 A to Schaefer et al. discloses a fiber-reinforced cement-like material having short polyvinyl alcohol fibers in an amount of at least 2 volume % based on the total volume of the material. These fibers have an elongation at break of between about 4 and 8% and a modulus of more than 130 g/dtex. A process for the preparation of the material is also disclosed. U.S. Pat. No. 4,306,911 A to Gordon et al. discloses a method for the production of a fiber-reinforced hydraulically obtained setting material. U.S. Pat. No. 4,339,273 A to Meier et al. discloses a process for producing a fiber-reinforced, hydraulically setting composition, the composition produced, and the use thereof. U.S. Pat. No. 5,298,071 A to Vondran discloses a fiber-hydratable cement composition comprising a uniform dispersion interground fiber in hydratable cement powder. U.S. Pat. No. 6,528,151 B1 to Shah et al. discloses an extruded fiber reinforced cement matrix composite made by mixing cement, water, water soluble binder, and relatively short, discontinuous reinforcing fibers, preferably short polyvinyl alcohol fibers, to provide an extrudable mixture, then extruding the mixture to shape, and curing the cement. U.S. Pat. No. 6,723,162 B1 to Cheyrezy et al. discloses concrete comprising organic fibers dispersed in a cement matrix, concrete cement matrix, and premixes. Some of its examples employ polyvinyl alcohol fibers. US 2002/0019465 A1 to Li et al. discloses short fiber-reinforced cementitious composites which are self-compacting and can be prepared by adding hydrophilic polymer fibers to a cement composition containing polymeric thickener and superplasticizer. "Fracture Toughness of Microfiber Reinforced Cement Composites", Nelson, et al., *J. Mat. Civil. Eng., September/October* 2002, discloses the results of fracture toughness tests conducted on thin sheet cement composites reinforced with polypropylene (PP), polyvinyl alcohol (PVA), and refined cellulose fibers under air-dry conditions. However, the cementitious products of these references have a high density. In other words, the present state-of-the-art of cement-based panels reinforced with PVA fibers as presented by these references deals with full density panels and not with the lightweight panels.

U.S. patent application Ser. No. 10/666,294, incorporated herein by reference, discloses a multi-layer process for producing structural cementitious panels (SCP's or SCP panels), and SCP's produced by such a process. After one of an initial deposition of loosely distributed, chopped fibers or a layer of slurry upon a moving web, fibers are deposited upon the slurry layer. Also, it discloses a structural cementitious panel (SCP) produced by its process, and an apparatus suitable for producing structural cementitious panels according to its process.

SUMMARY OF THE INVENTION

The present invention relates to a polyvinyl alcohol (PVA) fiber-reinforced cementitious composition for producing extremely tough, lightweight cement-based composites. This composition is a mixture of inorganic binder, lightweight fillers and preferred varieties of PVA fibers. It has been found that the material combination of the invention lends itself to lightweight, cement-based composites that possess significant toughness (energy absorption capability). For the composites of the invention, the toughness attained is several orders of magnitude greater than that for the composites reinforced with other varieties of fibers such as alkali-resistant glass, carbon or steel. The PVA fibers are selected to have preferred properties and parameters that lead to good composite performance. These preferred varieties of PVA fibers may be used in combination with other types of fibers such as alkali-resistant glass, carbon, steel or other polymer fibers. Cement-based composites manufactured using the disclosed formulation of the invention can be targeted for a variety of applications in building constructions. The disclosed formulation and the resulting composites are particularly useful in applications where damage due to impact loads (e.g. hail damage) is of great concern. Some examples of the potential applications include roofing tiles and exterior sidings for buildings.

Typical compositions for embodiments of panels of the present invention which achieve the combination of low density, improved flexural strength, and nailability comprise inorganic binder (examples—gypsum-cement, Portland cement or other hydraulic cements) having, distributed throughout the full thickness of the panel, selected PVA fibers, lightweight fillers (examples—hollow glass microspheres, hollow ceramic microspheres, plastic microspheres, and/or perlite uniformly), and superplasticizer/high-range water reducing admixtures (examples—polynapthalene sulfonates, poly-acrylates, etc.).

The panels may be single layer panels or multilayer panels. A single or multi layer panel may also be provided with a sheet of mesh, e.g. fiber glass mesh if desired. A typical panel is made from a mixture of water and inorganic binder with the selected PVA fibers, lightweight ceramic microspheres and/or polymer microspheres, and superplasticizer throughout the mixture. Other additives such as accelerating and retarding admixtures, viscosity control additives may optionally be added to the mixture to meet the demands of the manufacturing process involved.

A key feature of the cementitious panels of this invention is that the panels are lightweight. Preferably, the density of the cementitious panels of invention is less than 85 pcf, or more preferably, the density of the cementitious panels of invention is less than 70 pcf. The present invention employs selected PVA fibers in lightweight cementitious panels to achieve panels having advantageous properties.

The preferred fibers can be used alone or in combination with other types of fibers such as alkali-resistant glass, carbon fibers, steel fibers or other polymer fibers.

The flexural toughness of the composite is typically greater than 2.25 Joules, according to the flexural toughness characterization method as described in this specification. Moreover the panel may act as a shear panel at fiber volume fraction of at least 2%.

DETAILED DESCRIPTION OF THE INVENTION

Figure 1:
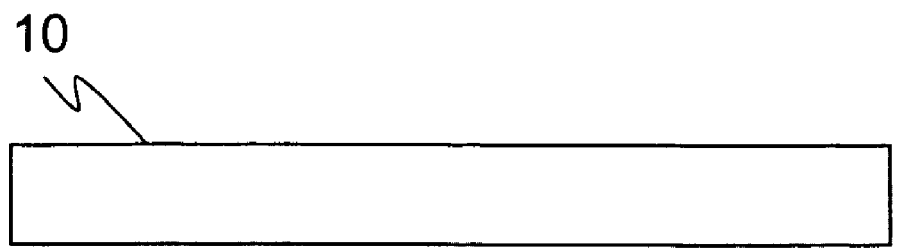
FIG. 1 is a schematic side view of a single layer panel of the present invention.

As previously discussed, there is a need for building panels that are light in weight and are capable of replacing currently available cement-based and wood-based panels to provide improved toughness to resist failure due to impacts resulting from hail or other objects carried by high winds. Wood-based panels and products generally provide adequate flexural toughness performance, but they are not dimensionally stable when subject to water and can be attacked by rot or insects. The currently available cement-based panels and products suffer from the following deficiencies: heavy product density, inferior toughness performance, instability under freeze-thaw conditions leading to delamination of panel, poor mold and mildew resistance and termite resistance in panels reinforced with cellulose fibers, and poor moisture durability in panels reinforced with cellulose fibers.

Further, when wood-based panels or cement-based panels reinforced with cellulose fibers are used, it is necessary to protect them against moisture by applying water-resistant coating or additional water-resistant panels over them, at significant additional cost. In contrast, the panels of the invention are water-resistant, and dimensionally stable. The panels can be cut with tools used for wood panels and fastened to framing with nails or screws. Where desirable, tongue and groove construction is possible.

The principal starting materials used to make panels of the invention are inorganic binder, e.g., calcium sulfate alpha hemihydrate, hydraulic cement, and pozzolanic materials, selected PVA fibers, lightweight fillers, e.g., perlite, ceramic microspheres and/or polymer microspheres, superplasticizer, e.g., polynapthalene sulphonates and/or poly-acrylates, water, and optional additives.

Calcium Sulfate Hemihydrate

Calcium sulfate hemihydrate, which may be used in panels of the invention, is made from gypsum ore, a naturally occurring mineral, (calcium sulfate dihydrate $CaSO_4.2H_2O$). Unless otherwise indicated, "gypsum" will refer to the dihydrate form of calcium sulfate. After being mined, the raw gypsum is thermally processed to form a settable calcium sulfate, which may be anhydrous, but more typically is the hemihydrate, $CaSO_4.1/2H_2O$. For the familiar end uses, the settable calcium sulfate reacts with water to solidify by forming the dihydrate (gypsum). The hemihydrate has two recognized morphologies, termed alpha hemihydrate and beta hemihydrate. These are selected for various applications based on their physical properties and cost. Both forms react with water to form the dihydrate of calcium sulfate. Upon hydration, alpha hemihydrate is characterized by giving rise to rectangular-sided crystals of gypsum, while beta hemihydrate is characterized by hydrating to produce needle-shaped crystals of gypsum, typically with large aspect ratio. In the present invention either or both of the alpha or beta forms may be used depending on the mechanical performance desired. The beta hemihydrate forms less dense microstructures and is preferred for low density products. The alpha hemihydrate forms more dense microstructures having higher strength and density than those formed by the beta hemihydrate. Thus, the alpha hemihydrate could be substituted for beta hemihydrate to increase strength and density or they could be combined to adjust the properties.

A typical embodiment for the inorganic binder used to make panels of the present invention comprises of hydraulic cement such as Portland cement, high alumina cement, pozzolan-blended Portland cement, or mixtures thereof.

Another typical embodiment for the inorganic binder used to make panels of the present invention comprises a blend containing calcium sulfate alpha hemihydrate, hydraulic cement, pozzolan, and lime.

Hydraulic Cement

ASTM defines "hydraulic cement" as follows: a cement that sets and hardens by chemical interaction with water and is capable of doing so under water. There are several types of hydraulic cements that are used in the construction and building industries. Examples of hydraulic cements include Portland cement, slag cements such as blast-furnace slag cement and super-sulfated cements, calcium sulfoaluminate cement, high-alumina cement, expansive cements, white cement, and rapid setting and hardening cements. While calcium sulfate hemihydrate does set and harden by chemical interaction with water, it is not included within the broad definition of hydraulic cements in the context of this invention. All of the aforementioned hydraulic cements can be used to make the panels of the invention.

The most popular and widely used family of closely related hydraulic cements is known as Portland cement. ASTM defines "Portland cement" as a hydraulic cement produced by pulverizing clinker consisting essentially of hydraulic calcium silicates, usually containing one or more of the forms of calcium sulfate as an interground addition. To manufacture Portland cement, an intimate mixture of limestone, argallicious rocks and clay is ignited in a kiln to produce the clinker, which is then further processed. As a result, the following four main phases of Portland cement are produced: tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO.Al_2O_3.Fe_2O_3$ or $C_4AF$). Other compounds present in minor amounts in Portland cement include calcium sulfate and other double salts of alkaline sulfates, calcium oxide, and magnesium oxide. Of the various recognized classes of Portland cement, Type III Portland cement (ASTM classification) is preferred for making the panels of the invention, because of its fineness it has been found to provide greater strength. The other recognized classes of hydraulic cements including slag cements such as blast-furnace slag cement and super-sulfated cements, calcium sulfoaluminate cement, high-alumina cement, expansive cements, white cement, rapidly setting and hardening cements such as regulated set cement and VHE cement, and the other Portland cement types can also be successfully used to make the panels of the present invention. The slag cements and the calcium sulfoaluminate cement have low alkalinity and are also suitable to make the panels of the present invention.

PVA Fibers

Substantial differences in composite mechanical performance occur with the use of different varieties of PVA fibers. Accordingly, the present invention selects PVA fibers having characteristics believed to lead to good composite performance. Table 1 lists such properties.

TABLE 1

| FIBER PROPERTY | VALUE |
| --- | --- |
| Preferred Diameter | 10-400 microns |
| More Preferred Diameter | 10-100 microns |
| Most Preferred Diameter | 10-50 microns |
| Preferred Fiber Length | 0.1 to 1.0 inches |
| More Preferred Fiber Length | 0.20 to 0.75 inches |
| Most Preferred Fiber Length | 0.20 to 0.5 inches (for example 0.25 inches) |
| Preferred Fiber Elastic Modulus | 20 to 50 GPa |
| More Preferred Fiber Elastic Modulus | 30 to 50 GPa |

Polyvinyl alcohol (PVA) fibers are polymers of the general formula $(-CH_2-CH(OH)-)_n$ with molecular weights of, for example, 13,000 to 100,000 and a density of, for example, 1.23 to 1.30 gm/cc and are generally prepared as known in the art.

Preferred commercially available PVA fibers are listed in TABLE 2.

TABLE 2

| Preferred commercially available PVA fibers | KURALON REC15 |
| --- | --- |
| | KURALON REC100L |
| | KURALON RM182 |
| | KURALON RE182 |
| | KURALON RBW203 |
| | KURALON RKW1502 |
| | KURALON RMS182 |
| | KURALON RMH182 |
| | KURALON RKW182 |
| | KURALON RFS602 |
| | KURALON RF350 |

TABLE 2-continued

| More preferred commercially available PVA fibers | KURALON REC15 |
| --- | --- |
| | KURALON REC100L |
| | KURALON RMS182 |
| | KURALON RFS602 |
| | KURALON RKW1502 |

KURALON polyvinyl alcohol fibers are available from Kuraray Co., Ltd., Kurashiki, Japan The PVA fibers according to the present invention are added to the cement-like substrate in an amount that provides at least 0.50% by volume, preferably 0.50% to 3.00%, by volume of these fibers in the resultant product. Fiber mixtures below 0.50% do not provide a material with the desired characteristics. Fiber mixtures above 3.00% by volume make the preparation of the desired products very expensive without any noteworthy improvement in the bending or impact strength. The length of the individual fibers may be uniform or may vary.

The PVA fibers are uniformly distributed in the cement material. The fibers may be monofilaments of PVA or multifilament threads of PVA. The cross-section of the fibers can take a variety of forms, especially resulting from physical and chemical variations in preparation processes. For example, the spinning solution material, the precipitation bath and the spinneret nozzles may be varied. In this manner, the preparation of round fibers, multilobal fibers, hollow fibers, porous fibers, etc. is facilitated. The outer fiber surface may be roughened, split or felted by physical post-treatment processes.

PVA fibers can easily be chemically modified because of their high chemical reactivity. Various functional groups such as carboxyl groups, amide groups, nitrile groups, phosphate groups, sulfate groups, etc. can be introduced by addition reactions or radical reactions. Brighteners or adhesive agents can be introduced onto or into the fibers by purely physical means and can provide aid in the anchoring of the PVA fibers in the cement-like material. By the methods described above, PVA fibers may be made inflammable, hydrophobic, or cross-linked. All PVA fibers modified in this way are suitable as fillers in the present invention.

According to the process of the present invention, polyvinyl alcohol fibers may be added alone to the cement-like material or may be added with glass, or other synthetic or natural, fibers alone or in combination. In addition to the reinforcing fibers, adjuvants such as cellulose waste, wood chips, "fibrids" (e.g. fibrids of polypropylene) and other fillers may be added to the reinforced material.

Other Optional Fibers

Glass fibers are commonly used as insulating material, but they have also been used as reinforcing materials with various matrices. The fibers themselves provide tensile strength to materials that may otherwise be subject to brittle failure. The fibers may break when loaded, but the usual mode of failure of composites containing glass fibers occurs from degradation and failure of the bond between the fibers and the continuous phase material. Thus, such bonds are important if the reinforcing fibers are to retain the ability to increase ductility and strengthen the composite over time. It has been found that glass fiber reinforced cements do lose strength as time passes, which has been attributed to attack on the glass by the lime which is produced when cement is cured. One possible way to overcome such attack is to cover the glass fibers with a protective layer, such as a polymer layer. In general, such protective layers may resist attack by lime, but it has been found that the strength is reduced in panels of the invention and, thus, protective layers are not preferred. A more expensive way to limit lime attack is to use special alkali-resistant glass fibers (AR glass fibers), such as Nippon Electric Glass (NEG) 350Y. Such fibers have been found to provide superior bonding strength to the matrix and are, thus, preferred for panels of the invention. The glass fibers are monofilaments that have a diameter from about 5 to 25 microns (micrometers) and typically about 10 to 15 microns (micrometers). The filaments generally are combined into 100 filament strands, which may be bundled into rovings containing about 50 strands. The strands or rovings will generally be chopped into suitable filaments and bundles of filaments, for example, about 0.25 to 3 inches (6.3 to 76 mm) long, preferably 1 to 2 inches (25 to 50 mm).

It is also possible to include other polymer fibers in the panels of the invention. Such polymer fibers, for example polypropylene, polyethylene, high density polyethylene, polyacrylonitrile, polyamide, polyimide and/or aramid fibers, are less expensive than alkali-resistant glass fibers and are not subject to attack by lime. Carbon or steel fibers are also potential additives.

Pozzolanic Materials

As has been mentioned, most Portland and other hydraulic cements produce lime during hydration (curing). It is desirable to react the lime to reduce attack on glass fibers. It is also known that when calcium sulfate hemihydrate is present, it reacts with tricalcium aluminate in the cement to form ettringite, which can result in undesirable cracking of the cured product. This is often referred to in the art as "sulfate attack." Such reactions may be prevented by adding "pozzolanic" materials, which are defined in ASTM C618-97 as ". . . siliceous or siliceous and aluminous materials which in themselves possess little or no cementitious value, but will, in finely divided form and in the presence of moisture, chemically react with calcium hydroxide at ordinary temperatures to form compounds possessing cementitious properties." One often used pozzolanic material is silica fume, a finely divided amorphous silica which is the product of silicon metal and ferro-silicon alloy manufacture. Characteristically, it has a high silica content and a low alumina content. Various natural and man-made materials have been referred to as having pozzolanic properties, including pumice, perlite, diatomaceous earth, tuff, trass, metakaolin, microsilica, ground granulated blast furnace slag, and fly ash. While silica fume is a particularly convenient pozzolan for use in the panels of the invention, other pozzolanic materials may be used. In contrast to silica fume, metakaolin, ground granulated blast furnace slag, and pulverized fly ash have a much lower silica content and large amounts of alumina, but can be effective pozzolanic materials. When silica fume is used, it will constitute about 5 to 20 wt. %, preferably 10 to 15 wt. %, of the reactive powders (examples of reactive powders: hydraulic cement only; blends of hydraulic cement and pozzolan; or blends of hydraulic cement, calcium sulfate alpha hemihydrate, pozzolan, and lime). If other pozzolans are substituted, the amounts used will be chosen to provide chemical performance similar to silica fume.

Lightweight Fillers/Microspheres

The lightweight cementitious panels of the present invention typically have a density of 60 to 85 pounds per cubic foot, preferably 60 to 75 pounds per cubic foot. In contrast, typical cementitious panels have densities such as 90 to 145 pounds per cubic foot.

To assist in achieving these low densities the panels are provided with lightweight filler particles. Such particles typical have a mean particle diameter size from 50 to 250 microns (micrometers) and/or fall within a particle diameter size range of 10 to 500 microns. They also typically have a particle density (specific gravity) in the range from 0.02 to 1.00. Microspheres serve an important purpose in the panels of the invention, which would otherwise be heavier than is desirable for building panels. Used as lightweight fillers, the microspheres help to lower the average density of the product. When the microspheres are hollow, they are sometimes referred to as microballoons.

Typical lightweight fillers for including in mixtures employed to make panels of the present invention are selected from the group consisting of ceramic microspheres, polymer microspheres, perlite, glass microspheres, and/or fly ash cenospheres.

Ceramic microspheres can be manufactured from a variety of materials and using different manufacturing processes. Although a variety of ceramic microspheres can be utilized as a filler component in the panels of the invention, the preferred ceramic microspheres of the invention are produced as a coal combustion by-product and are a component of the fly ash found at coal fired utilities, for example, Extendospheres-SG made by Kish Company Inc., Mentor, Ohio or FILLITE® Brand ceramic microspheres made by Trelleborg Fillite Inc., Norcross, Ga. USA. The chemistry of the preferred ceramic microspheres of the invention is predominantly silica ($SiO_2$) in the range of about 50 to 75 wt. % and alumina ($Al_2O_3$) in the range of about 15 to 40 wt. %, with up to 35 wt. % of other materials. The preferred ceramic microspheres of the invention are hollow spherical particles with diameters in the range of 10 to 500 microns (micrometers), a shell thickness typically about 10% of the sphere diameter, and a particle density preferably about 0.50 to 0.80 g/mL. The crushing strength of the preferred ceramic microspheres of the invention is greater than 1500 psi (10.3 MPa) and is preferably greater than 2500 psi (17.2 MPa).

Preference for ceramic microspheres in the panels of the invention primarily stems from the fact that they are about three to ten times stronger than most synthetic glass microspheres. In addition, the preferred ceramic microspheres of invention are thermally stable and provide enhanced dimensional stability to the panel of invention. Ceramic microspheres find use in an array of other applications such as adhesives, sealants, caulks, roofing compounds, PVC flooring, paints, industrial coatings, and high temperature-resistant plastic composites. Although they are preferred, it should be understood that it is not essential that the microspheres be hollow and spherical, since it is the particle density and compressive strength which provide the panel of the invention with its low weight and important physical properties. Alternatively, porous irregular particles may be substituted, provided that the resulting panels meet the desired performance.

The polymer microspheres preferably also are hollow spheres with a shell made of polymeric materials such as polyacrylonitrile, polymethacrylonitrile, polyvinyl chloride or polyvinylidine chloride, or mixtures thereof. The shell may enclose a gas used to expand the polymeric shell during manufacture. The outer surface of the polymer microspheres may have some type of an inert coating such as calcium carbonate, titanium oxides, mica, silica, and talc. The polymer microspheres have a particle density preferably about 0.02 to 0.15 g/mL and have diameters in the range 10 to 350 microns (micrometers). The presence of polymer microspheres facilitates simultaneous attainment of the dual objectives of low panel density and enhanced cuttability and nailability. Although all of the panels of the invention can be cut using conventional carpentry tools, including polymer microspheres reduces resistance to nailing. This is a valuable property when nails are driven by hand. When pneumatic nailing equipment is used, the resistance of the panel to nailing is of less importance, so the strength of the panel can be higher than for panels which are to be nailed by hand. Furthermore, when a blend of ceramic and polymer microspheres is used in certain proportions, synergetic effects are realized in terms of improved rheological properties of the slurry and an increase in the dry bending strength of the panel.

Other lightweight fillers, for example glass microspheres, perlite or hollow alumino-silicate cenospheres or microspheres derived from fly ash, are also suitable for including in mixtures in combination with or in place of ceramic microspheres employed to make panels of the present invention.

The glass microspheres typically are made of alkali resistant glass materials and may be hollow. Typical glass microspheres are available from GYPTEK INC., Suite 135, 16 Midlake Blvd SE, Calgary, AB, T2X 2X7, CANADA.

In a first embodiment of the invention, only ceramic microspheres are used throughout the full thickness of the panel. The panel contains preferably about 35 to 42 wt. % of ceramic microspheres uniformly distributed throughout the thickness of the panel.

In a second embodiment of the invention, a blend of lightweight ceramic and polymer microspheres is used throughout the full thickness of the panel. In order to achieve the desired properties, the volume fraction of the polymer microspheres in the panel of the second embodiment of the invention will preferably be in the range of 7 to 15% of the total volume of the dry ingredients, where the dry ingredients of the composition are the reactive powders (examples of reactive powders: hydraulic cement only; a blend of hydraulic cement and pozzolan; or a blend of hydraulic cement, calcium sulfate alpha hemihydrate, pozzolan, and lime), ceramic microspheres, polymer microspheres, and alkali-resistant glass fibers. The amount of polymer microspheres may be varied by adjusting the ratio of water-to-reactive powder, as desired to achieve a similar effect. A typical aqueous mixture has a ratio of water-to-reactive powders from greater than 0.3/1 to 0.7/1.

Formulation

The components used to make the shear resistant panels of the invention are PVA fibers, hydraulic cement, calcium sulfate alpha hemihydrate, an active pozzolan such as silica fume, lime, ceramic microspheres, polymer microspheres, superplasticizer (e.g., sodium salt of polynapthalene sulfonate), and water. Small amounts of accelerators and/or retarders may be added to the composition to control the setting characteristics of the green (i.e., uncured) material. Typical non-limiting additives include accelerators for hydraulic cement such as calcium chloride, accelerators for calcium sulfate alpha hemihydrate such as gypsum, retarders such as DTPA (diethylene triamine pentacetic acid), tartaric acid or an alkali salt of tartaric acid (e.g., potassium tartrate), shrinkage reducing agents such as glycols, and entrained air.

Panels of the invention include a continuous phase in which PVA fibers and microspheres are uniformly distributed. The continuous phase results from the curing of an aqueous mixture of the reactive powders (examples of reactive powders: hydraulic cement only; blend of hydraulic cement and pozzolan; or blend of hydraulic cement, calcium sulfate alpha hemihydrate, pozzolan, and lime), preferably including superplasticizer and/or other additives.

Typical broad weight proportions of embodiments of these reactive powders (inorganic binder) in the invention, based on dry weight of the reactive powders, are shown in TABLE 3 and 4. TABLE 5 lists typical ranges of reactive powders (inorganic binder), lightweight filler, superplacticizer and water in compositions of the present invention.

TABLE 3

| Reactive Powder | Weight Proportion (%) | |
|---|---|---|
| | Broad | Typical |
| Hydraulic Cement | 70-100 | 100 |
| Pozzolan | 0-30 | 0 |

TABLE 4

| Reactive Powder | Weight Proportion (%) | |
|---|---|---|
| | Broad | Typical |
| Hydraulic Cement | 20-55 | 25-40 |
| Calcium Sulfate Alpha Hemihydrate | 35-75 | 45-65 |
| Pozzolan | 5-25 | 10-15 |
| Lime | up to 3.5 | 0.75-1.25 |

TABLE 5

Typical Lightweight Cementitious Mixture Compositions

| Ingredient | Min-Max Range (Weight %) |
|---|---|
| Inorganic Binder | 30-60 |
| Lightweight Filler | 10-40 |
| Superplasticizer | 0.5-4.0 |
| Water | 15-40 |

TABLE 5A

| Typical Cementitious Mixture Composition (dry basis) | Weight Proportion (%) | Weight Proportion (%) |
|---|---|---|
| Reactive Powder | 35-70 | 35-68 |
| Lightweight Filler | 20-50 | 23-49 |
| Glass Fibers | 0-20 | 0-17 |
| PVA Fibers | 0.5 to 5.0 | 0.75 to 3.0 |

Lime is not required in all formulations of the invention, but adding lime may provide superior panels. A typical amount of lime in the reactive powders is about 0.2 to 3.5 wt. %.

In the first embodiment of the invention, the dry ingredients of the composition will be the reactive powders examples of reactive powders: hydraulic cement only; blend of hydraulic cement and pozzolan; or blend of hydraulic cement, calcium sulfate alpha hemihydrate, pozzolan, and lime), PVA fibers, ceramic microspheres and optional alkali-resistant glass fibers, and the wet ingredients of the composition will be water and superplasticizer. The dry ingredients and the wet ingredients are combined to produce the panel of the invention. The PVA fibers and ceramic microspheres are uniformly distributed in the matrix throughout the full thickness of the panel. Of the total weight of dry ingredients, the panel of the invention is formed from about 49 to 56 wt. % reactive powders, 0.75 to 3.0 wt. % PVA fibers, 35 to 42 wt. % ceramic microspheres and 0 to 12 wt. % alkali-resistant glass fibers. In the broad range, the panel of the invention is formed from 35 to 58 wt. % reactive powders, 0.5 to 5.0 wt. % PVA fibers, 34 to 49 wt. % ceramic microspheres, and 0 to 17 wt. % alkali-resistant glass fibers of the total dry ingredients. The amounts of water and superplasticizer added to the dry ingredients will be sufficient to provide the desired slurry fluidity needed to satisfy processing considerations for any particular manufacturing process. The typical addition rates for water range between 35 to 60% of the weight of reactive powders and those for superplasticizer range between 1 to 8% of the weight of reactive powders.

The optional glass fibers are monofilaments having a diameter of about 5 to 25 microns (micrometers), preferably about 10 to 15 microns (micrometers). The monofilaments typically are combined in 100 filament strands, which may be bundled into rovings of about 50 strands. The length of the glass fibers will preferably be about 1 to 2 inches (25 to 50 mm) and broadly about 0.25 to 3 inches (6.3 to 76 mm). The glass fibers and PVA fibers have random orientation, providing isotropic mechanical behavior in the plane of the panel.

The second embodiment of the invention contains PVA fibers with a blend of ceramic and polymer microspheres uniformly distributed throughout the full thickness of the panel. Incorporation of polymer microspheres in the panel helps to achieve the combination of low density and ductility required to enable the panel to be cut or fastened (either nailed or screwed) with conventional carpentry tools. In addition, the rheological properties of the slurry are improved substantially when a combination of hollow ceramic and polymer microspheres is utilized as part of the composition. Accordingly, in the second embodiment of the invention, the dry ingredients of the composition are the reactive powders (hydraulic cement, calcium sulfate alpha hemihydrate, pozzolan, and lime), ceramic microspheres, polymer microspheres, and optional alkali-resistant glass fibers, and the wet ingredients of the composition will be water and superplasticizer. The dry ingredients and the wet ingredients will be combined to produce the panel of the invention. To achieve good fastening and cutting ability, the volume fraction of the polymer microspheres in the panel will preferably be in the range of 7 to 15% of the total volume of dry ingredients. Of the total weight of dry ingredients, the panel of the invention is formed from about 54 to 65 wt. % reactive powders, 0.75 to 3.00 wt. % PVA fibers, 25 to 35 wt. % ceramic microspheres, 0.5 to 0.8 wt. % polymer microspheres, and 0 to 10 wt. % alkali-resistant glass fibers. In the broad range, the panel of the invention is formed from 42 to 68 wt. % reactive powders, 0.50 to 5.00 wt. % PVA fibers, 23 to 43 wt. % ceramic microspheres, 0.2 to 1.0 wt. % polymer microspheres, and 0 to 15 wt. %, e.g., 5 wt. %, alkali-resistant glass fibers, based on the total dry ingredients. The amounts of water and superplasticizer added to the dry ingredients will be adjusted to provide the desired slurry fluidity needed to satisfy the processing considerations for any particular manufacturing process. The typical addition rates for water range between 35 to 70% of the weight of reactive powders, but could be greater than 60% up to 70%, preferably 65% to 75%, when it is desired to use the ratio of water-to-reactive powder to reduce panel density and improve nailability. Since the water-to-reactive powder ratio can be adjusted to provide a similar effect to that of polymer microspheres, either may be used, or a combination of the two methods. The amount of superplasticizer will range between 1 to 8% of the weight of reactive powders.

The optional glass fibers are monofilaments having a diameter of about 5 to 25 microns (micrometers), preferably about 10 to 15 microns (micrometers). They typically are bundled into strands and rovings as discussed above. The length of the glass fibers preferably is about 1 to 2 inches (25 to 50 mm) and broadly about 0.25 to 3 inches (6.3 to 76 mm). The fibers will have random orientation providing isotropic mechanical behavior in the plane of the panel.

In the second embodiment of the invention, incorporation of polymer microspheres in quantities as described above as a partial substitution for the ceramic microspheres helps to improve the composite dry flexural strength. In addition, partial substitution of ceramic microspheres by polymer microspheres reduces the water-to-reactive powders ratio needed to achieve a given slurry fluidity. Slurry containing a blend of ceramic and polymer microspheres will have superior flow behavior (workability) compared to the one containing ceramic microspheres only. This is of particular importance when the industrial processing of the panels of the invention requires the use of slurries with superior flow behavior.

Making a Panel of the Invention

The reactive powders (examples of reactive powders: hydraulic cement only; a blend of hydraulic cement and pozzolan; or a blend of hydraulic cement, calcium sulfate alpha hemihydrate, pozzolan, and lime), the chopped PVA fibers and lightweight filler, e.g., microspheres, are blended in the dry state in a suitable mixer. Typically the PVA fibers are available in the chopped form, and are added to the dry ingredients directly or to the wet slurry in the chopped form directly. Typically PVA fibers are not chopped from the roving as is typically done in the case of glass fibers.

Then, water, a superplasticizer (e.g., the sodium salt of polynapthalene sulfonate), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form a smooth homogeneous slurry.

The slurry containing PVA fibers may then be optionally combined with glass or other fibers, in several ways, with the objective of obtaining a uniform slurry mixture. The cementitious panels are then formed by pouring the slurry containing fibers into an appropriate mold of desired shape and size. If necessary, vibration is provided to the mold to obtain good compaction of material in the mold. The panel is given required surface finishing characteristics using an appropriate screed bar or trowel.

Other methods of depositing a mixture of the slurry, PVA fibers, and optional glass or other fibers, will occur to those familiar with the panel-making art. For example, rather than using a batch process to make each panel, a continuous sheet may be prepared in a similar manner, which after the material has sufficiently set, can be cut into panels of the desired size.

In many applications, for example in siding, the panels will be nailed or screwed to vertical framing. In some applications, such as where the panels are used as structural subflooring or flooring underlayment, they preferably will be made with a tongue and groove construction, which may be made by shaping the edges of the panel during casting or before use by cutting the tongue and groove with a router.

Another feature of the present invention is that the resulting cementitious panel is constructed so that the PVA fibers, and optional glass or other fibers, are uniformly distributed throughout the panel. The percentage of fibers relative to the volume of slurry preferably constitutes approximately in the range of 0.5% to 3%, for example 1.5%.

Panels of the present invention typically have one or more of the following properties:

Flexural Strength is typically at least 750 psi (5.2 MPa), and preferably greater than 1000 psi (6.9 MPa).

Flexural Toughness is typically at least 2.25 Joules depicting total area under the load versus deflection curve for a 4 inches (102 mm) wide, 12 inches (305 mm) long, 0.5 (12.7 mm) inch thick specimen loaded over a span of 10 inch (254 mm) in 4-point bending according to the ASTM C947 test procedure.

Lateral Fastener Resistance is typically at least 300 pounds for a 0.5 (12.7 mm) inch thick panel as measured according to a modified version of ASTM D 1761 as described by R. Tuomi and W. McCutcheon, ASCE Structural Division Journal, July 1978.

EXAMPLES

TABLE 6 summarizes properties of six fibers investigated. The Kuralon® PVA RF350x12 fiber has a tensile strength of about 910 MPa and Elastic Modulus of about 30 GPa. In contrast, the Kuralon® REC 15x12 polyvinyl alcohol fiber has a tensile strength of about 1600 MPa and Elastic Modulus of about 40 GPa.

TABLE 6

Fibers Investigated

| Fiber Material | Fiber Trade Name | Manufacturer | Fiber Length (inches) | Fiber Diameter (microns) | Fiber Specific Gravity |
|---|---|---|---|---|---|
| Polyvinyl Alcohol | KURALON RF350x12 | Kuraray Co., Ltd. | 0.50 | 200.0 | 1.30 |
| Polyvinyl Alcohol | KURALON REC15x12 | Kuraray Co., Ltd. | 0.50 | 40.0 | 1.30 |
| Alkali-Resistant Glass Fiber | NEG ACS 13H-350Y | Nippon Electric Glass Co. | 0.50 | 13.0 | 2.76 |
| Carbon Fiber | FORTAFIL 143 | Fortafil Fibers | 0.25 | 7.0 | 1.80 |
| Steel Micro Fiber | CW2-3750U | International Steel Wool | 0.38 | 125.0 | 7.85 |
| Acrylic Fiber (polymeric) | DOLANIT Type 18 | Fisipe Barcelona, S.A. | 0.24 | 27 | 1.18 |
| Polypropylene Fiber (polymeric) | STEALTH | Synthetic Industries | 0.50 | 20 | 0.91 |

All fibers investigated had length equal to or smaller than 0.50 inches (12.7 mm) and diameter equal to or less than 200 microns. The mixture compositions investigated were produced by combining the following ingredients: reinforcing fibers, inorganic binder, lightweight fillers, superplasticizer and water. In total, 19 mixes were investigated. The design slurry density of the mixtures investigated was 70 pounds per cubic foot (pcf). The fiber volume fraction in the mixture was varied and 0.5% to 2.0% for the various fibers investigated.

Mixture Composition of the Invention

TABLE 7 provides a description of the target mixture compositions for these examples. The weight fractions of various ingredients shown in this table are for the wet slurry excluding fibers. TABLES 8 and 8A show the actual compositions for the wet slurry in combination with PVA fibers for these examples.

TABLE 7

Target Lightweight Cementitious Mixture Composition of Examples

| Ingredient | (Weight %) |
|---|---|
| Inorganic Binder[1,2] | 43.3 |
| Lightweight Filler[3,4] | 26.2 |

TABLE 7-continued

Target Lightweight Cementitious Mixture Composition of Examples

| Ingredient | (Weight %) |
|---|---|
| Superplasticizer[5] | 1.9 |
| Water | 28.6 |
| Sum | 100% |
| Fibers | As described elsewhere in the present specification |

[1]Inorganic Binder used in the Examples: Gypsum-cement composition with following composition: Calcium Sulfate Hemihydrate - 58%; Portland Cement - 29%; Silica Fume - 12%; Lime - 1%
[2]Other inorganic binders, for example as mentioned below may be used as part of the invention:
a. Portland Cement Only
b. Portland Cement and Pozzolanic Material/s Combination (examples: slag, silica fume, metakaoline)
[3]Lightweight filler used in the Examples: Hollow ceramic microspheres
[4]Other lightweight fillers, for example as mentioned below may be used as part of this invention:
a. Expanded perlite
b. Hollow plastic microspheres
c. Expanded polystyrene beads
[5]Superplasticizer used in the Examples: Polynapthalene sulfonate Other additives, such as accelerating and retarding admixtures, viscosity control additives, may be optionally added to meet the demands of the manufacturing process involved.

The panel was made as described above in the section entitled "Making A Panel Of The Invention".

TABLE 8

| | Mixture Composition (weight percent) | | | |
|---|---|---|---|---|
| Ingredient | Example 2A (0.5% Fiber Volume Fraction) | Example 2B (1.0% Fiber Volume Fraction) | Example 2C (1.5% Fiber Volume Fraction) | Example 2D (2.0% Fiber Volume Fraction) |
| PVA Fibers | 0.6 | 1.2 | 1.7 | 2.3 |
| Inorganic Binder | 43.9 | 43.6 | 43.4 | 43.1 |
| Lightweight Ceramic spheres | 26.5 | 26.4 | 26.2 | 26.1 |
| Superplasticizer | 2.0 | 2.0 | 2.0 | 1.9 |
| Water | 27.0 | 26.8 | 26.7 | 26.5 |
| Total | 100.0 | 100.0 | 100.0 | 100.0 |

TABLE 8A

| | Mixture Composition (weight percent) | | | | |
|---|---|---|---|---|---|
| Ingredient | Example 1A (0.5% Fiber Volume Fraction) | Example 1B (1.0% Fiber Volume Fraction) | Example 1C (1.5% Fiber Volume Fraction) | Example 1D (2.0% Fiber Volume Fraction) | Example 1F (3.0% Fiber Volume Fraction) |
| Inorganic Binder | 43.9 | 43.6 | 43.4 | 43.1 | 42.6 |
| Lightweight Ceramic Spheres | 26.5 | 26.4 | 26.2 | 26.1 | 25.8 |
| Superplasticizer | 2.0 | 2.0 | 2.0 | 1.9 | 1.9 |
| Water | 27.0 | 26.8 | 26.7 | 26.5 | 26.2 |
| PVA Fibers | 0.6 | 1.2 | 1.7 | 2.3 | 3.5 |
| Sum | 100.0 | 100.0 | 100.0 | 100.0 | 100.0 |

Results

TABLE 9 summarizes the results for compositions investigated. TABLE 9 shows data of performance of fiber-reinforced lightweight cementitious formulations. The data for Examples 2A-2D are for composites of the present invention employing PVA Fiber KURALON REC15x12 (also labeled PVA-2). Half-inch thick composite panels were produced by mixing the various ingredients in a Hobart mixer and casting the resulting mixture in a mold. The fiber orientation in the panels was three-dimensional random for all the mixture compositions evaluated. The results from the investigation are also illustrated in FIGS. 2 to 5. A discussion on the results follows.

TABLE 9

| Example | Fiber Type | Fiber Volume Fraction (%) | Design Slurry Density (pcf) | Toughness (Joules) | Flexural Strength (psi) | Maximum Deflection (inches) | Lateral Fastener Resistance (pounds) |
|---|---|---|---|---|---|---|---|
| 1A | PVA Fiber KURALON RF350x12 (PVA-1) | 0.50 | 70.0 | 0.1 | 561 | 0.028 | 80 |

TABLE 9-continued

| Example | Fiber Type | Fiber Volume Fraction (%) | Design Slurry Density (pcf) | Toughness (Joules) | Flexural Strength (psi) | Maximum Deflection (inches) | Lateral Fastener Resistance (pounds) |
|---|---|---|---|---|---|---|---|
| 1B | PVA Fiber KURALON RF350x12 (PVA-1) | 1.00 | 70.0 | 0.1 | 687 | 0.030 | 111 |
| 1C | PVA Fiber KURALON RF350x12 (PVA-1) | 1.50 | 70.0 | 2.4 | 812 | 0.057 | 184 |
| 1D | PVA Fiber KURALON RF350x12 (PVA-1) | 2.00 | 70.0 | 3.6 | 827 | 0.104 | 191 |
| 1E | PVA Fiber KURALON RF350x12 (PVA-1) | 2.50 | 70.0 | 5.6 | 891 | 0.241 | 282 |
| 1F | PVA Fiber KURALON RF350x12 (PVA-1) | 3.00 | 70.0 | 6.7 | 1035 | 0.201 | 292 |
| 2A | PVA Fiber KURALON REC15x12 (PVA-2) | 0.50 | 70.0 | 1.8 | 665 | 0.048 | 145 |
| 2B | PVA Fiber KURALON REC15x12 (PVA-2) | 1.00 | 70.0 | 4.3 | 850 | 0.160 | 335 |
| 2C | PVA Fiber KURALON REC15x12 (PVA-2) | 1.50 | 70.0 | 7.8 | 1050 | 0.197 | 382 |
| 2D | PVA Fiber KURALON REC15x12 (PVA-2) | 2.00 | 70.0 | 11.6 | 1181 | 0.342 | 533 |
| 3A | AR Glass Fiber NEG ACS 13H-350Y | 0.50 | 70.0 | 0.7 | 447 | 0.035 | — |
| 3B | AR Glass Fiber NEG ACS 13H-350Y | 1.00 | 70.0 | 0.8 | 610 | 0.092 | — |
| 3C | AR Glass Fiber NEG ACS 13H-350Y | 2.00 | 70.0 | 2.2 | 1065 | 0.108 | — |
| 4A | Carbon Fiber | 0.50 | 70.0 | 0.3 | 847 | 0.043 | 246 |
| 4B | Carbon Fiber | 1.00 | 70.0 | 0.3 | 790 | 0.057 | 328 |
| 4C | Carbon Fiber | 1.50 | 70.0 | 0.3 | 899 | 0.066 | 337 |
| 4D | Carbon Fiber | 2.00 | 70.0 | 0.3 | 874 | 0.045 | 422 |
| 5A | Steel Micro Fiber | 0.50 | 70.0 | 0.1 | 484 | 0.031 | — |
| 5B | Steel Micro Fiber | 1.00 | 70.0 | 0.1 | 629 | 0.028 | — |
| 5C | Steel Micro Fiber | 1.50 | 70.0 | 0.2 | 838 | 0.051 | — |
| 5D | Steel Micro Fiber | 2.00 | 70.0 | 0.3 | 952 | 0.052 | — |

Composite Flexural Toughness

Flexural panel specimens 4 inch wide (102 mm) and 12 inch (305 mm) long were loaded in 4-point bending over a span of 10 inch (254 mm) per ASTM C947 test procedure. The load was applied at a constant displacement rate of 0.5 inch/minute (12.7 mm/minute). The flexural load versus displacement response was recorded. The composite toughness was calculated as total area under load versus deflection curve until specimen failure.

Figure 2:
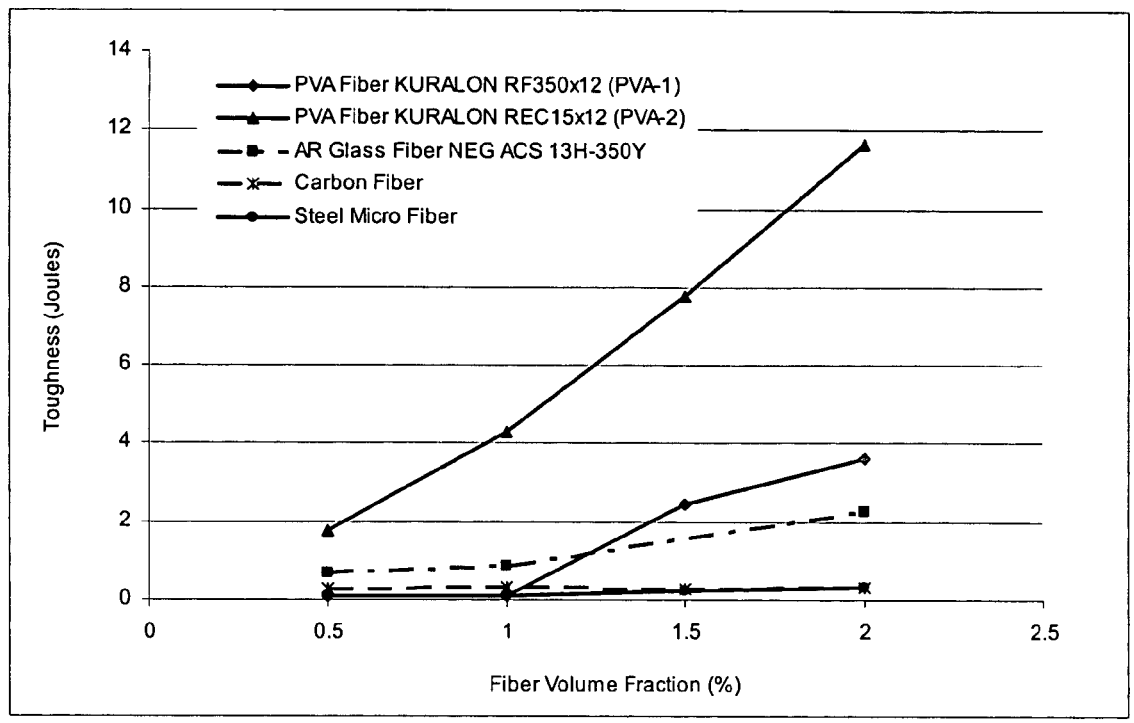
FIG. 2 presents data showing influence of fiber type and fiber volume fraction on flexural toughness of lightweight, fiber reinforced cement-based composites.
Figure 3:
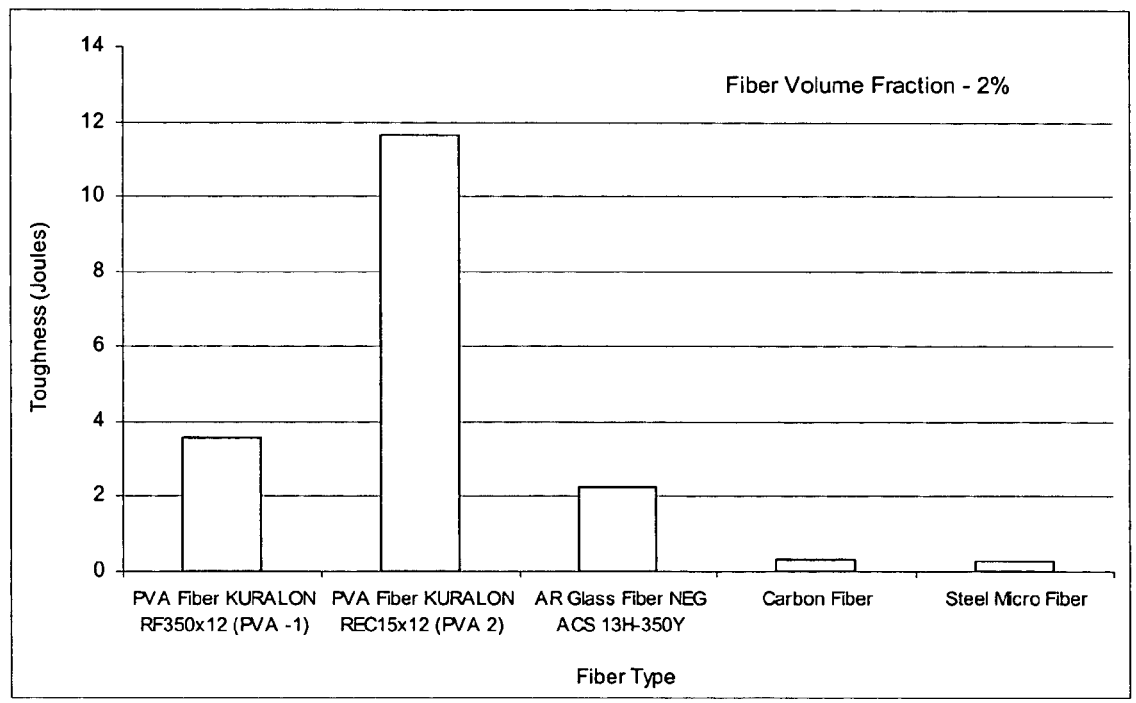
FIG. 3 presents data showing influence of fiber type (at 2% of fiber volume fraction) on flexural toughness of lightweight, fiber reinforced cement-based composites.

TABLE 9 as well as FIGS. 2 and 3 show the flexural toughness values obtained for the various composites investigated. The following important observations can be made.

Composites reinforced with carbon fibers and steel micro fibers are extremely brittle as indicated by their low toughness values.

Composites reinforced with alkali-resistant glass fibers and PVA RF350 fibers have slightly better toughness in comparison to the composites reinforced with carbon and steel micro fibers.

The toughness properties of composites reinforced with KURALON REC15x12 (PVA-2) PVA fibers are particularly noteworthy. It can be observed that the composites reinforced with PVA REC15 fibers have toughness values that are several orders of magnitude greater than those for the composites reinforced with other types of fibers.

In particular, at 2% fiber volume fraction, the composites reinforced with PVA REC15 fibers absorb about 5 times more energy than the composites reinforced with alkali-resistant glass fibers, about 35 times more energy than the composites reinforced with carbon fibers and about 40 times more energy than the composites reinforced with steel micro fibers (FIG. 3).

Flexural Strength

Flexural panel specimens 4 inches wide (102 mm) and 12 inches (305 mm) long were loaded in 4-point bending over a span of 10 inches (254 mm) per ASTM C947 test procedure. The load was applied at a constant displacement rate of 0.5 inch/minute (12.7 mm/minute). The flexural load versus displacement response was recorded. The flexural strength of the composite was calculated per ASTM C947 test procedure.

Figure 4:
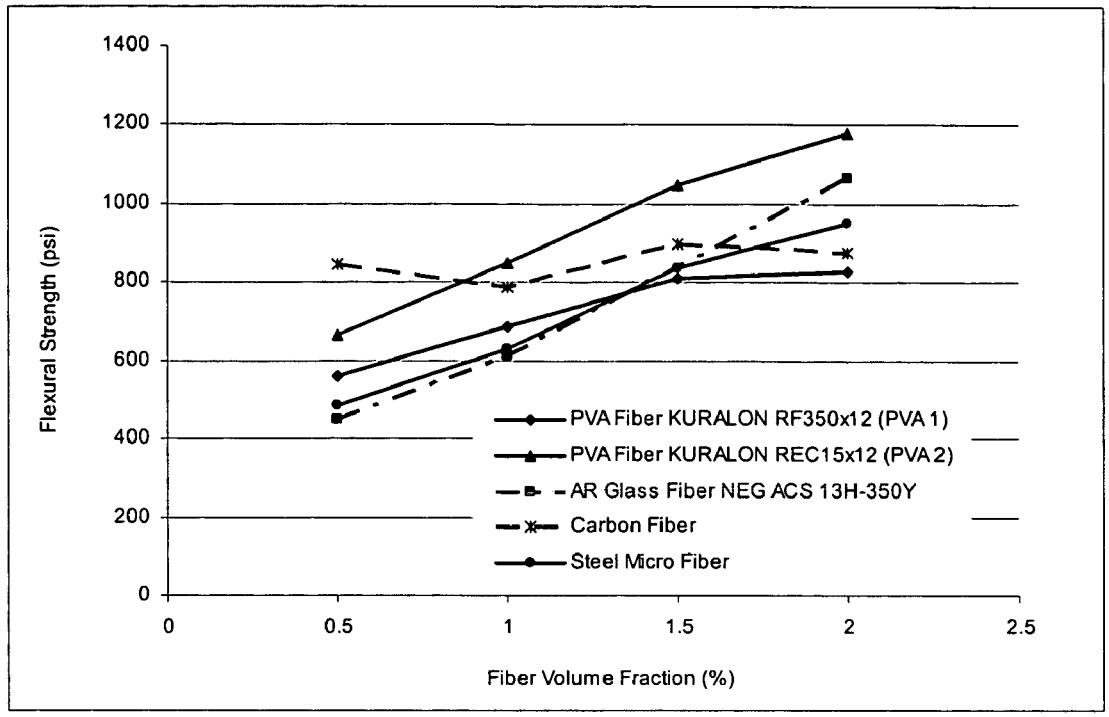
FIG. 4 presents data showing influence of fiber type and fiber volume fraction on flexural strength of lightweight, fiber reinforced cement-based composites.

TABLE 9 as well as FIG. 4 shows the flexural strength data obtained for various mixture compositions investigated. The composites reinforced with PVA REC15 fiber have the best flexural strength performance.

Lateral Fastener Resistance

The lateral fastener resistance of the composite was measured according to a modified version of ASTM D 1761 as described by R. Tuomi and W. McCutcheon, ASCE Structural Division Journal, July 1978. A screw, 1-5/8 inches (41.3 mm) in length was used as the fastener to perform the test.

Figure 5:
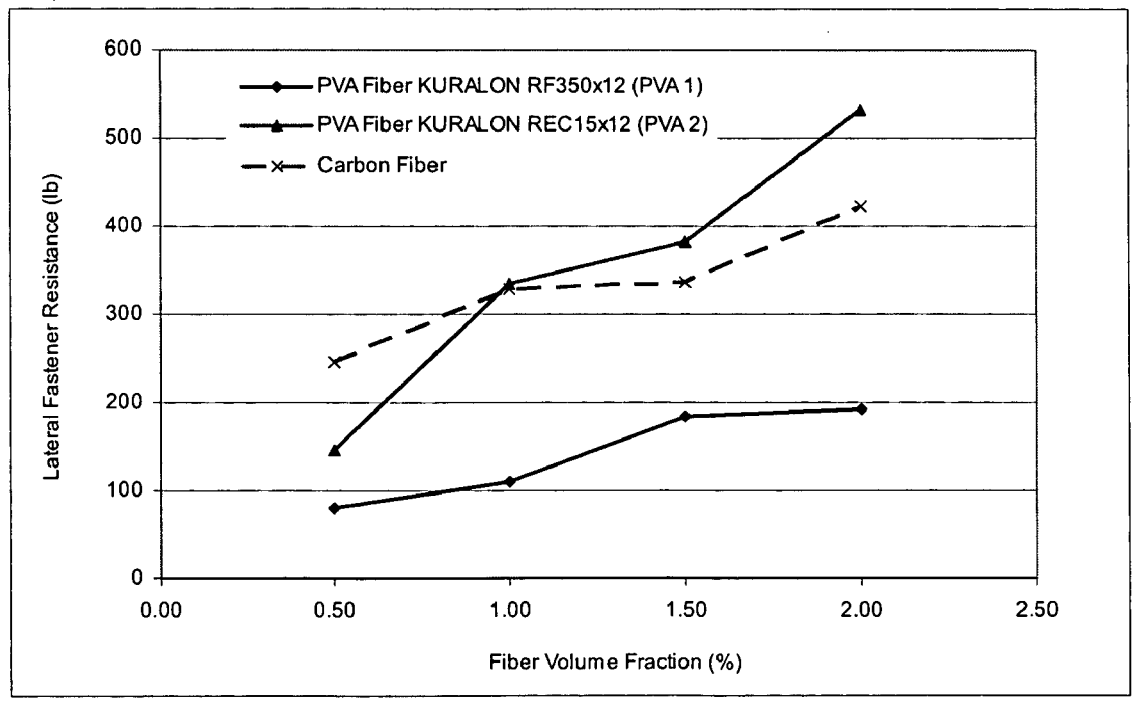
FIG. 5 presents data showing influence of fiber type and fiber volume fraction on lateral fastener resistance of lightweight, fiber reinforced cement-based composites.

TABLE 9 as well as FIG. 5 shows the lateral fastener pull our resistance for the various composites tested. Lateral fastener resistance quantifies the lateral pull out resistance provided by the panel to fasteners. Screws with length equal to 1-5/8 inches (41.3 mm) were used to determine the lateral fastener resistance of the composites. In the figure it can be observed that the composites reinforced with PVA REC15 fibers have the best lateral fastener resistance. The difference in performance of the composites reinforced with the two different types of PVA fibers (PVA REC15 versus PVA RF350) is particularly noteworthy. On the one hand, the composites reinforced with PVA REC 15 fibers perform extremely well. The performance of composites reinforced with PVA RF350 fibers is unsatisfactory.

Maximum Deflection

Figure 6:
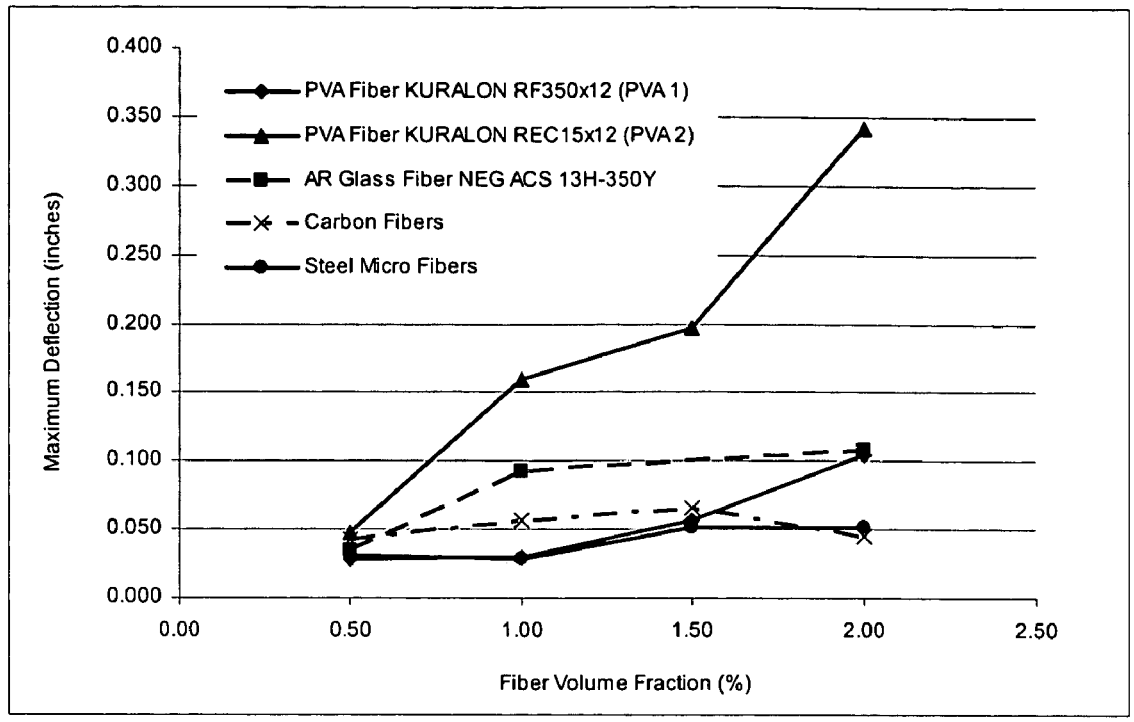
FIG. 6 present data showing influence of fiber type and fiber volume fraction on maximum deflection of lightweight, fiber reinforced cement-based composites.
Figure 7:
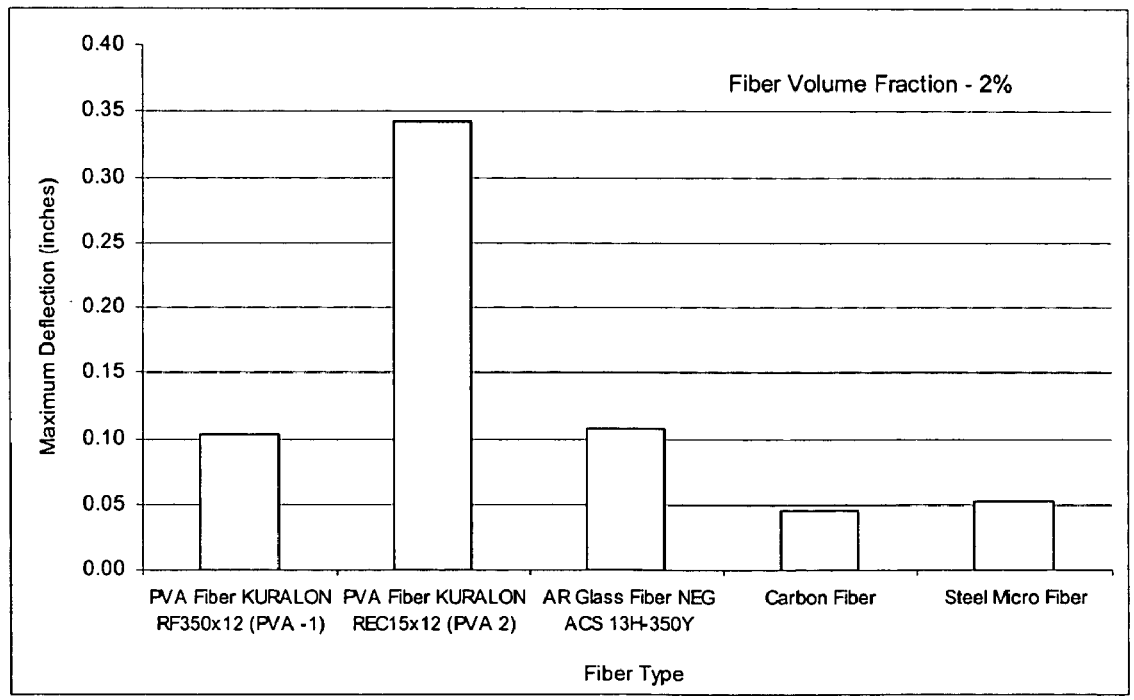
FIG. 7 present data showing influence of fiber type on maximum deflection of lightweight, fiber reinforced cement-based composites.

TABLE 9 as well as FIGS. 6 and 7 presents data showing influence of fiber type and fiber volume fraction on maximum deflection of lightweight, fiber reinforced cement-based composites. The maximum deflection values shown in the TABLE 9 were measured using the flexural test conducted per ASTM C947 standard, and these values represent the flexural deflection of the specimen under the load points corresponding to the peak load observed during the test regime.

From the FIGS. 6 and 7 it can be clearly observed that the composites reinforced with PVA fibers have greater maximum deflection. This observation and composite mechanical behavior signifies the fact that the composites reinforced with PVA fibers have greater deformation capability (i.e., greater ductility), hence greater toughness. From these results it can be easily appreciated that for the composites reinforced with carbon fibers and steel micro fibers, the composite ductility does not improve even with increase in fiber volume fraction in the composite. The composites reinforced with carbon and steel micro fibers even at 2% fiber volume fraction have maximum deflection values of less than 0.07 inches. These results, in combination with the composite toughness values signify the fact that the composites reinforced with carbon and steel micro fibers are extremely brittle in their mechanical response compared to the composites reinforced with PVA fibers.

Comparison of Selected PVA Fibers With Acrylic Fibers and Polypropylene Fibers

Use of selected PVA fiber in a composite was compared with use of acrylic fibers or polypropylene fibers using the above-described materials and procedures but substituting acrylic fibers or polypropylene fibers for the fibers of the above-presented examples.

Figure 8:
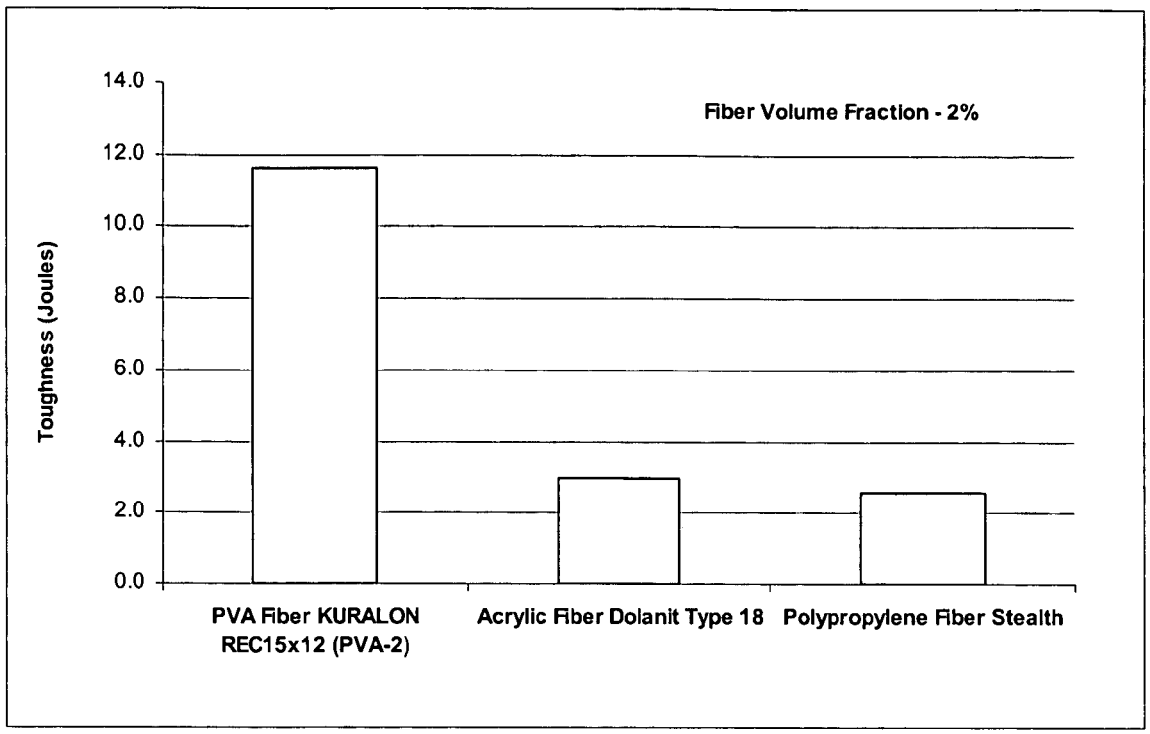
FIG. 8 presents data showing influence of fiber type on toughness of lightweight, fiber reinforced cement-based composites.

TABLE 10 as well as FIG. 8 presents data showing influence of fiber type on toughness of lightweight, fiber reinforced cement-based composites. From the results presented in TABLE 10 and FIG. 8 it can be clearly observed that other types of polymer fibers do not produce enhancement in composite toughness equivalent to that produced by PVA fibers.

Figure 9:
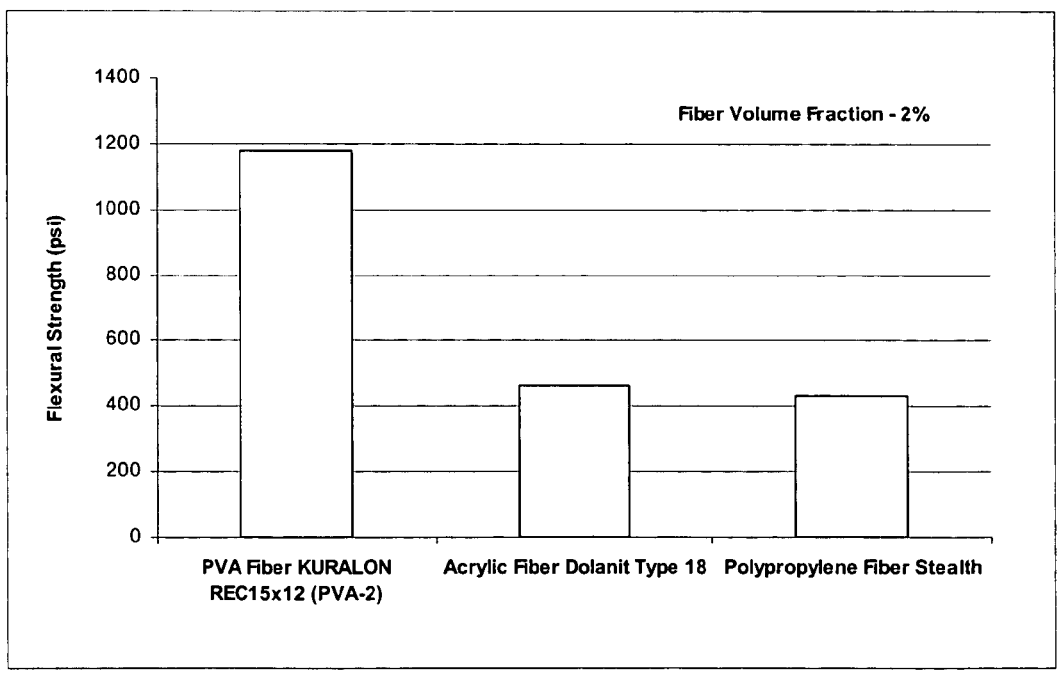
FIG. 9 presents data showing influence of fiber type on flexural strength of lightweight, fiber reinforced cement-based composites.

TABLE 11 as well as FIG. 9 presents data showing influence of fiber type on flexural strength of lightweight, fiber reinforced cement-based composites. From the results presented in TABLE 11 and FIG. 9 it can be observed that other types of polymer fibers do not produce enhancement in composite flexural strength equivalent to that produced by PVA fibers.

TABLE 10

| Example Number | Fiber | Fiber Volume Fraction (%) | Design Slurry Density (pcf) | Toughness (Joules) |
|---|---|---|---|---|
| 2D | PVA Fiber KURALON REC15x12 (PVA-2) | 2.00 | 70.0 | 11.6 |
| 6 | Acrylic Fiber Dolanit Type 18 | 2.00 | 70.0 | 3.0 |
| 7 | Polypropylene Fiber Stealth | 2.00 | 70.0 | 2.6 |

TABLE 11

| Example Number | Fiber | Fiber Volume Fraction (%) | Design Slurry Density (pcf) | Flexural Strength (psi) |
|---|---|---|---|---|
| 2D | PVA Fiber KURALON REC15x12 (PVA-2) | 2.00 | 70.0 | 1181 |
| 6 | Acrylic Fiber DOLANIT Type 18 | 2.00 | 70.0 | 464 |
| 7 | Polypropylene Fiber STEALTH | 2.00 | 70.0 | 432 |

Preferred Properties of the PVA Fibers of the Invention

Based on this data, it becomes apparent that substantial differences in composite mechanical performance occur with the use of different varieties of PVA fibers. Accordingly, the preferred parameters and properties of the PVA fibers that lead to good composite performance are identified and highlighted in TABLE 1. Also, TABLE 2 lists some commercially available fibers that are preferred fibers of the present invention. These preferred varieties of fibers may be used in combination with other types of fibers such as alkali-resistant glass, carbon, steel or other polymer fibers.

While particular embodiments of the present invention have been shown and described, it will be appreciated by those skilled in the art that changes and modifications may be made thereto without departing from the invention in its broader aspects and as set forth in the following claims.

What is claimed is:

1. A reinforced, lightweight, dimensionally stable building panel having a density of 60-85 pcf (961-1360 kg/m³) and a flexural strength of about 750 to 1180 psi consisting essentially of:
a continuous phase resulting from the curing of an aqueous mixture of a cementitious composition, the cementitious composition consisting essentially of, on a dry basis, 35-70 wt. % reactive powder, 20-50 weight % lightweight filler, 0 weight % glass fibers, and 0.5-5.0 weight % polyvinyl alcohol fibers, the continuous phase being reinforced with the polyvinyl alcohol fibers and containing the lightweight filler having a particle specific gravity of from 0.02 to 1.00 and a mean particle diameter size from 50 to 250 microns and/or fall within a particle diameter size range of 10 to 500 microns, wherein the reactive powder comprises, on a dry basis, 35 to 75 wt. % calcium sulfate alpha hemihydrate, 20 to 55 wt. % hydraulic cement, 0.0 to 35 wt. % lime, and 5 to 25 wt. % of an active pozzolan, the continuous phase being uniformly reinforced with polyvinyl alcohol fibers and containing uniformly distributed ceramic microspheres, the spheres having an average diameter of about 10 to 500 microns (micrometers),
wherein the polyvinyl alcohol fibers consist of monofilaments and/or multi-filament threads of polyvinyl alcohol optionally modified by a functional group selected from at least one member of the group consisting of carboxyl, amide, nitrile, phosphate, and sulfate, and an optional brightener in the polyvinylalcohol fiber, an optional brightener on the polyvinylalcohol fiber, an optional adhesive agent in the polyvinylalcohol fiber, and an optional adhesive agent on the polyvinyl alcohol fiber, wherein the fibers have a diameter of about 10 to 400 microns (micrometers) and a length of about 0.1 to 1 inches (2.5 to 25.4 mm), and a fiber elastic modulus of 20-50 GPa, and wherein the resulting lightweight building panel has a thickness of 0.25-1.0 in. (6.3-25.4 mm).

2. The panel of claim 1, wherein the continuous phase is uniformly reinforced with the polyvinyl alcohol fibers, the lightweight filler is uniformly distributed.

3. The panel of claim 1, wherein the panel has a Flexural Strength of at least 1000 psi (6.9 MPa) to 1180 psi.

4. The panel of claim 1, wherein the panel has a Flexural Toughness of at least 2.25 Joules depicting total area under the load versus deflection curve for a 4 (102 mm) inches wide, 12 inches (305 mm) long, 0.5 inches (12.7 mm) thick specimen loaded over a span of 10 (254 mm) inches in 4-point bending according to the ASTM C947 test procedure.

5. The panel of claim 1, wherein the panel has a Lateral Fastener Resistance of at least 300 pounds for a 0.5 inch (12.7 mm) thick panel.

6. The panel of claim 1, wherein the polyvinyl alcohol fibers consist of monofilaments and/or multi-filament threads of polyvinyl alcohol and/or polyvinyl alcohol optionally modified by a functional group selected from at least one member of the group consisting of carboxyl, amide, nitrile, phosphate, and sulfate.

7. The panel of claim 1, wherein the lightweight filler comprises hollow ceramic spheres which comprise about 50 to 75 wt. % silica, about 15 to 40 wt. % alumina, and up to 35 wt. % of other materials.

8. The panel of claim 1, wherein the lightweight filler comprises polymer microspheres comprising at least one member of the group consisting of polyacrylonitrile, polymethacrylonitrile, polyvinyl chloride and polyvinylidene chloride, and optionally coated with at least one powder selected from the group consisting of calcium carbonate, titanium oxide, mica, silica and talc.

9. The panel of claim 1, wherein the polyvinyl alcohol fibers have a diameter of about 10 to 100 microns (micrometers) and a length of about 0.2 to 0.5 inches (5.1 to 12.7 mm), and a fiber elastic modulus of 30-50 GPa.

10. The panel of claim 1, wherein the edges are shaped to permit adjacent panels to provide tongue-and-groove.

11. The panel of claim 1, wherein the polyvinyl alcohol fibers constitute approximately 0.5% to 3% by volume of the aqueous mixture on a wet basis.

12. The panel of claim 1, wherein the polyvinyl alcohol fibers constitute approximately 1-3% by volume of the aqueous mixture on a wet basis.

13. The panel of claim 1, wherein the polyvinyl alcohol fibers constitute approximately 1-2% by volume of the aqueous mixture on a wet basis.

14. The panel of claim 1, wherein the polyvinyl alcohol fibers consist of monofilaments and/or multi-filament threads of polyvinyl alcohol modified by a functional group selected from at least one member of the group consisting of carboxyl, amide, nitrile, phosphate, and sulfate.

15. The panel of claim 1, wherein the lightweight filler comprises uniformly distributed polymer spheres having an average diameter of about 10 to 350 μm.

16. The panel of claim 1, wherein the PVA fibers are monofilaments having a length of about 0.25 to 1 inches (6 to 25.4 mm).

17. The panel of claim 1, wherein the hydraulic cement consists essentially of portland cement.

18. The panel of claim 1, wherein the aqueous mixture has a ratio of water-to-reactive powders from greater than 0.3/1 to 0.7/1.

19. The panel of claim 1, wherein the panel has a Flexural Toughness of at least 4.3 Joules depicting total area under the load versus deflection curve for a 4 inches (102 mm) wide, 12 inches (305 mm) long, 0.5 inches (12.7 mm) thick specimen loaded over a span of 10 (254 mm) inches in 4-point bending according to the ASTM C947 test procedure, wherein the polyvinyl alcohol fibers have a diameter of about 10 to 50 microns (micrometers) and a length of about 0.1 to 1 inches (2.5 to 25.4 mm), and a fiber elastic modulus of about 40-50 GPa and wherein the polyvinyl alcohol fibers constitute approximately 1-2% by volume of the aqueous mixture on a wet basis.

20. The panel of claim 1, wherein the polyvinyl alcohol fibers constitute 0.75-5% by weight of the cementitious composition.

21. The panel of claim 19, wherein the panel has a lateral fastener resistance of 335 to 533 pounds and the polyvinyl alcohol fibers have a diameter of about 40 to 50 microns (micrometers) and a length of about 0.25 to 0.75 inches.

22. A structure comprising the panel of claim 1, framing and nails or screws, wherein the panel is attached to the framing by the nails or screws.

23. The panel of claim 1, consisting of a single layer of the continuous phase reinforced with the polyvinyl alcohol fibers and containing the lightweight filler.

24. The building panel of claim 1 consisting of:
    said continuous phase resulting from the curing of said aqueous mixture of cementitious composition, the cementitious composition consisting of, on a dry basis, 35-70 wt. % reactive powder, 20-50 weight % lightweight filler, 0 weight % glass fibers, and 0.5-5.0 weight % polyvinyl alcohol in the form of polyvinyl alcohol fibers, the continuous phase being reinforced with the polyvinyl alcohol fibers and containing the lightweight filler having a particle specific gravity of from 0.02 to 1.00 and a mean particle diameter size from 50 to 250 microns and/or fall within a particle diameter size range of 10 to 500 microns,
    wherein the polyvinyl alcohol fibers consist of monofilaments and/or multi-filament threads of polyvinyl alcohol optionally modified by a functional group selected from at least one member of the group consisting of carboxyl, amide, nitrile, phosphate, and sulfate, and an optional brightener in the polyvinylalcohol fiber, an optional brightener on the polyvinylalcohol fiber, an optional adhesive agent in the polyvinylalcohol fiber, and an optional adhesive agent on the polyvinyl alcohol fiber, wherein the fibers have a diameter of about 10 to 400 microns (micrometers) and a length of about 0.1 to 1 inches (2.5 to 25.4 mm), and a fiber elastic modulus of 20-50 GPa, and
    wherein the resulting lightweight building panel has a thickness of 0.25 -1.0 in. (6.3-25.4 mm).

25. The panel of claim 24, wherein the panel has a Flexural Toughness of at least 4.3 Joules depicting total area under the load versus deflection curve for a 4 inches (102 mm) wide, 12 inches (305 mm) long, 0.5 inches (12.7 mm) thick specimen loaded over a span of 10 (254 mm) inches in 4-point bending according to the ASTM C947 test procedure, and a fiber elastic modulus of about 40-50 GPa and wherein the polyvinyl alcohol, wherein the panel has a lateral fastener resistance of 335 to 533 pounds and the polyvinyl alcohol fibers have a diameter of about 40 to 50 microns (micrometers) and a length of about 0.25 to 0.75 inches polyvinyl alcohol fibers, wherein the fibers constitute approximately 1-2% by volume of the aqueous mixture on a wet basis.

26. The panel of claim 25, wherein the polyvinyl alcohol fibers consist of monofilaments and/or multi-filament threads of polyvinyl alcohol and/or polyvinyl alcohol optionally modified by a functional group selected from at least one member of the group consisting of carboxyl, amide, nitrile, phosphate, and sulfate.

27. The building panel of claim 1 consisting of:
    said continuous phase resulting from the curing of said aqueous mixture of cementitious composition, the cementitious composition consisting of, on a dry basis, 35-70 wt. % reactive powder, 20-50 weight % lightweight filler, 0 weight % glass fibers, and 0.5-5.0 weight % polyvinyl alcohol in the form of polyvinyl alcohol fibers, the continuous phase being reinforced with the polyvinyl alcohol fibers and containing the lightweight filler having a particle specific gravity of from 0.02 to 1.00 and a mean particle diameter size from 50 to 250 microns and/or fall within a particle diameter size range of 10 to 500 microns,
    wherein the polyvinyl alcohol fibers consist of monofilaments and/or multi-filament threads of polyvinyl alcohol optionally modified by a functional group selected from at least one member of the group consisting of carboxyl, amide, nitrile, phosphate, and sulfate,
    wherein the fibers have a diameter of about 10 to 400 microns (micrometers) and a length of about 0.1 to 1 inches (2.5 to 25.4 mm), and a fiber elastic modulus of 20-50 GPa, and
    wherein the resulting lightweight building panel has a thickness of 0.25-1.0 in. (6.3-25.4 mm).

28. The building panel of claim 1, wherein the panel has a density of 60-75 pcf.

29. A reinforced, lightweight, dimensionally stable building panel having a density of 60-85 pcf (961-1360 kg/m$^3$) and a flexural strength of about 750 psi to about 1180 psi a continuous phase resulting from the curing of an aqueous mixture of a cementitious composition,
    the cementitious composition consisting essentially of, on a dry basis:
    35-70 wt. % reactive powder, 20-50 weight % lightweight filler, 0 weight % glass fibers, and 0.5-5.0 weight % polyvinyl alcohol fibers, the continuous phase being reinforced with the polyvinyl alcohol fibers and containing the lightweight filler having a particle specific gravity of from 0.02 to 1.00 and a mean particle size from 50 to 250 microns and/or fall within a particle diameter size range of 10 to 400 microns, wherein the reactive powder comprises, on a dry basis, portland hydraulic cement and active pozzolan,
    wherein the polyvinyl alcohol fibers consist of monofilaments and/or multi-filament threads of polyvinyl alcohol optionally modified by a functional group selected from at least one member of the group consisting of carboxyl, amide, nitrile, phosphate, and sulfate, and an optional brightener in the polyvinylalcohol fiber, an optional brightener on the polyvinylalcohol fiber, an optional adhesive agent in the polyvinylalcohol fiber, and an optional adhesive agent on the polyvinyl alcohol fiber, wherein the fibers have a diameter of about 10 to 400 microns (micrometers) and a length of about 0.1 to 1 inches (2.5 to 25.4 mm), and a fiber elastic modulus of 20 -50 GPa, and
    wherein the lightweight building panel has a thickness of 0.25-1.0 in (6.3-25.4 mm).

30. The panel of claim 29, wherein the continuous phase is uniformly reinforced with the polyvinyl alcohol fibers, the lightweight filler is uniformly distributed.

31. The panel of claim 29, wherein the polyvinyl alcohol fibers consist of monofilaments and/or multi-filament threads of polyvinyl alcohol and/or polyvinyl alcohol optionally modified by a functional group selected from at least one member of the group consisting of carboxyl, amide, nitrile, phosphate, and sulfate.

32. The building panel of claim 29 consisting of:

said continuous phase resulting from the curing of said aqueous mixture of cementitious composition, the cementitious composition consisting of, on a dry basis, 35-70 wt. % reactive powder, 20-50 weight % lightweight filler, 0 weight % glass fibers, and 0.5-5.0 weight % polyvinyl alcohol in the form of polyvinyl alcohol fibers, the continuous phase being reinforced with the polyvinyl alcohol fibers and containing the lightweight filler having a particle specific gravity of from 0.02 to 1.00 and a mean particle diameter size from 50 to 250 microns and/or fall within a particle diameter size range of 10 to 500 microns, wherein the polyvinyl alcohol fibers consist of monofilaments and/or multi-filament threads of polyvinyl alcohol optionally modified by a functional group selected from at least one member of the group consisting of carboxyl, amide, nitrile, phosphate, and sulfate, wherein the fibers have a diameter of about 10 to 400 microns (micrometers) and a length of about 0.1 to 1 inches (2.5 to 25.4 mm), and a fiber elastic modulus of 20-50 GPa, and wherein the resulting lightweight building panel has a thickness of 0.25-1.0 in. (6.3-25.4 mm).

33. The building panel of claim 29, wherein the panel has a density of 60-75 pcf.

* * * * *